(12) United States Patent
Levins et al.

(10) Patent No.: US 10,500,604 B2
(45) Date of Patent: Dec. 10, 2019

(54) LIQUID ADHESIVE DISPENSING SYSTEM

(71) Applicant: NORDSON CORPORATION, Westlake, OH (US)

(72) Inventors: Matthew P. Levins, Hoschton, GA (US); Charles P. Ganzer, Cumming, GA (US)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 15/893,353

(22) Filed: Feb. 9, 2018

(65) Prior Publication Data
US 2019/0247881 A1  Aug. 15, 2019

(51) Int. Cl.
*B05C 5/00* (2006.01)
*B05C 11/10* (2006.01)
*B05C 5/02* (2006.01)
*F16K 1/52* (2006.01)

(52) U.S. Cl.
CPC ............ *B05C 5/001* (2013.01); *B05C 5/0225* (2013.01); *B05C 11/1042* (2013.01); *F16K 1/523* (2013.01)

(58) Field of Classification Search
CPC .... B05C 5/001; B05C 5/0225; B05C 11/1042
USPC .......... 222/146.1, 146.2, 146.5, 309, 402.11, 222/402.14, 547, 549, 559
See application file for complete search history.

(56) References Cited

U.S. PATENT DOCUMENTS 3,412,971 A    11/1968  McDivitt
4,801,051 A *  1/1989  Lewis ................... B05C 5/0237
                                              222/309

(Continued)

FOREIGN PATENT DOCUMENTS

DE    202011107412 U1   2/2013
WO    2015/027673 A1    3/2015
WO    2015/126693 A1    8/2015

OTHER PUBLICATIONS

ISA/206—Invitation to Pay Additional Fees Mailed on May 13, 2019 for WO Application No. PCT/US19/015790.

(Continued)

*Primary Examiner* — Vishal Pancholi
(74) *Attorney, Agent, or Firm* — Baker & Hostetler LLP

(57) ABSTRACT

A dispenser for dispensing a liquid onto a substrate is disclosed. The dispenser includes a dispenser module including a nozzle body having an inlet, an outlet, a chamber for receiving a liquid, and a central valve body attached to the nozzle body. The central valve body defines a piston chamber. The dispenser module also includes a valve member having a piston portion disposed within the piston chamber of the central valve body and a needle portion extending form the piston portion into the chamber of the nozzle body. The dispenser also includes a heater block for heating the nozzle body, where the heater block defines a liquid passage for transporting liquid from the liquid supply to the dispenser. A first surface of the heater block directly contacts the nozzle body, and the entirety of the central valve body is spaced from the heater block. The dispenser also includes a stroke adjustment assembly comprising an adjustment rod configured to contact the valve member and a locking collar configured to alternate between an unlocked and a locked configuration.

11 Claims, 10 Drawing Sheets

(56) References Cited

U.S. PATENT DOCUMENTS

| | | | | |
|---|---|---|---|---|
| 5,207,352 A * | 5/1993 | Porter | ................... | B05B 12/087 |
| | | | | 222/1 |
| 5,350,159 A * | 9/1994 | Parker | ................... | B22D 41/14 |
| | | | | 222/593 |
| 5,747,102 A * | 5/1998 | Smith | ................... | B05C 5/001 |
| | | | | 427/98.4 |
| 6,056,155 A * | 5/2000 | Byerly | ................... | B05C 5/02 |
| | | | | 222/1 |
| 6,062,857 A | 5/2000 | Oppawsky et al. | | |
| 6,520,382 B2 * | 2/2003 | Estelle | ................... | B05C 5/001 |
| | | | | 222/146.1 |
| 7,070,066 B2 | 7/2006 | Strong et al. | | |
| 7,296,714 B2 * | 11/2007 | Byerly | ................... | B05C 5/0225 |
| | | | | 222/146.5 |
| 7,900,800 B2 * | 3/2011 | Hassler, Jr. | ............. | B05C 5/001 |
| | | | | 222/146.5 |
| 8,069,653 B2 * | 12/2011 | Ganzer | ................. | B05C 5/0225 |
| | | | | 239/533.11 |
| 8,201,717 B2 * | 6/2012 | Varga | ..................... | B05C 5/001 |
| | | | | 222/593 |
| 8,322,575 B2 * | 12/2012 | Riney | ................... | B05C 5/0225 |
| | | | | 222/146.5 |
| 10,130,970 B2 | 11/2018 | Groene et al. | | |
| 2007/0164089 A1 | 7/2007 | Gaugler | | |
| 2011/0300295 A1 | 12/2011 | Clark et al. | | |

OTHER PUBLICATIONS

ISA/220—Notification of Transmittal or Search Report and Written Opinion of the ISA, or the Declaration dated Aug. 21, 2019 for WO Application No. PCT/US19/015790.

\* cited by examiner

LIQUID ADHESIVE DISPENSING SYSTEM

TECHNICAL FIELD

This disclosure generally relates to a dispenser used to apply a hot melt adhesive to a substrate. More particularly, the disclosure relates to a dispenser where a dispenser module is clamped to other components of the dispenser and includes a stroke adjustment assembly for adjusting the stroke length of a valve member.

BACKGROUND

In certain applications, it is sometimes necessary to dispense liquids out of a cartridge or similar container and onto a desired target. For example, hot melt adhesives (such as PUR) may be dispensed out of a syringe-like cartridge and onto a desired substrate. In some applications, such as the dispensing of adhesive onto a cell phone assembly, the adhesive must be accurately dispensed into grooves having small dimensions. To perform this operation, conventional jetting dispenser have been utilized. "Jetting" in this context is understood to mean rapidly dispensing minute amounts of viscous material such that each jetted droplet releases from the dispenser. This is accomplished by repeatedly retracting a valve member within a chamber containing the adhesive and extending the valve member until the valve member impacts a valve seat. The impact from the valve member contacting the valve seat causes a minute amount of the viscous material to jet out of an orifice defined by the nozzle.

During a jetting operation, the dispenser must consistently maintain certain temperatures throughout parts of the dispenser through which the adhesive flows in order to ensure uniform adhesive characteristics exist across the system, and likewise optimal jetting performance. However, there also exists a need for materials within the dispenser, and particularly the portion of the dispenser jetting the adhesive, to possess an increased strength to withstand the high level of forces that result from the valve member repeatedly impacting the valve seat. Unfortunately, many such high strength materials have low thermal conductivity. Also, portions of the dispenser, such as pneumatically operated components, function best when isolated from the high temperatures required by the adhesive. Therefore, the conflicting objectives of high strength and high consistent temperatures can result in below optimal dispenser performance.

Additionally, the valve members are often pneumatically or piezoelectrically driven at high velocities and frequencies to jet the adhesive from the dispenser. The travel length of the needle between the retracted and extended positions, also known as the stroke length, is normally a fixed amount dictated by the combination of the valve member, nozzle, and other dispenser geometries. However, different adhesive dispensing applications can be optimally performed using different stroke lengths. As a result, the inability to adjust the stroke length of a valve member limits the utility of a particular dispenser with respect to different varieties of jetting applications.

Therefore, there is a need for a hot melt adhesive dispenser where heat is evenly distributed across the nozzle portion, but isolated from other aspects of the dispenser. There is also a need for a hot melt adhesive dispenser where the stroke length of the valve member is adjustable and can be reliably maintained throughout operation of the dispenser.

SUMMARY

A first embodiment of the present disclosure is a liquid dispenser module that comprises a housing including an inlet, an outlet, and a chamber in communication with the inlet and the outlet for receiving a liquid, and a valve member configured to be actuated from a first position to a second position so as to jet an amount of the liquid from the chamber through the outlet, where the first and second positions are separated by a stroke length. The liquid dispenser module also includes a stroke adjustment assembly that comprises an adjustment rod configured to contact the valve member, and a locking collar configured to alternate between an unlocked and a locked configuration, where 1) in the unlocked configuration, the adjustment rod is movable relative to the locking collar to adjust the stroke length, and 2) in the locked configuration, the adjustment rod is prevented from moving relative to the locking collar.

Another embodiment of the present disclosure is a dispenser for dispensing a liquid onto a substrate that comprises a liquid supply and a dispenser module. The dispenser module includes a nozzle body having an inlet, an outlet, and a chamber in communication with the inlet and the outlet for receiving a liquid, a central valve body attached to the nozzle body, where the central valve body defines a piston chamber, and a valve member having a piston portion disposed within the piston chamber of the central valve body and a needle portion extending form the piston portion into the chamber of the nozzle body. The dispenser module also includes a heater block for heating the nozzle body, where the heater block defines a liquid passage for transporting liquid from the liquid supply to the dispenser. A first surface of the heater block directly contacts the nozzle body, and the entirety of the central valve body is spaced from the heater block.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

DETAILED DESCRIPTION OF ILLUSTRATIVE EMBODIMENTS

Figure 1:
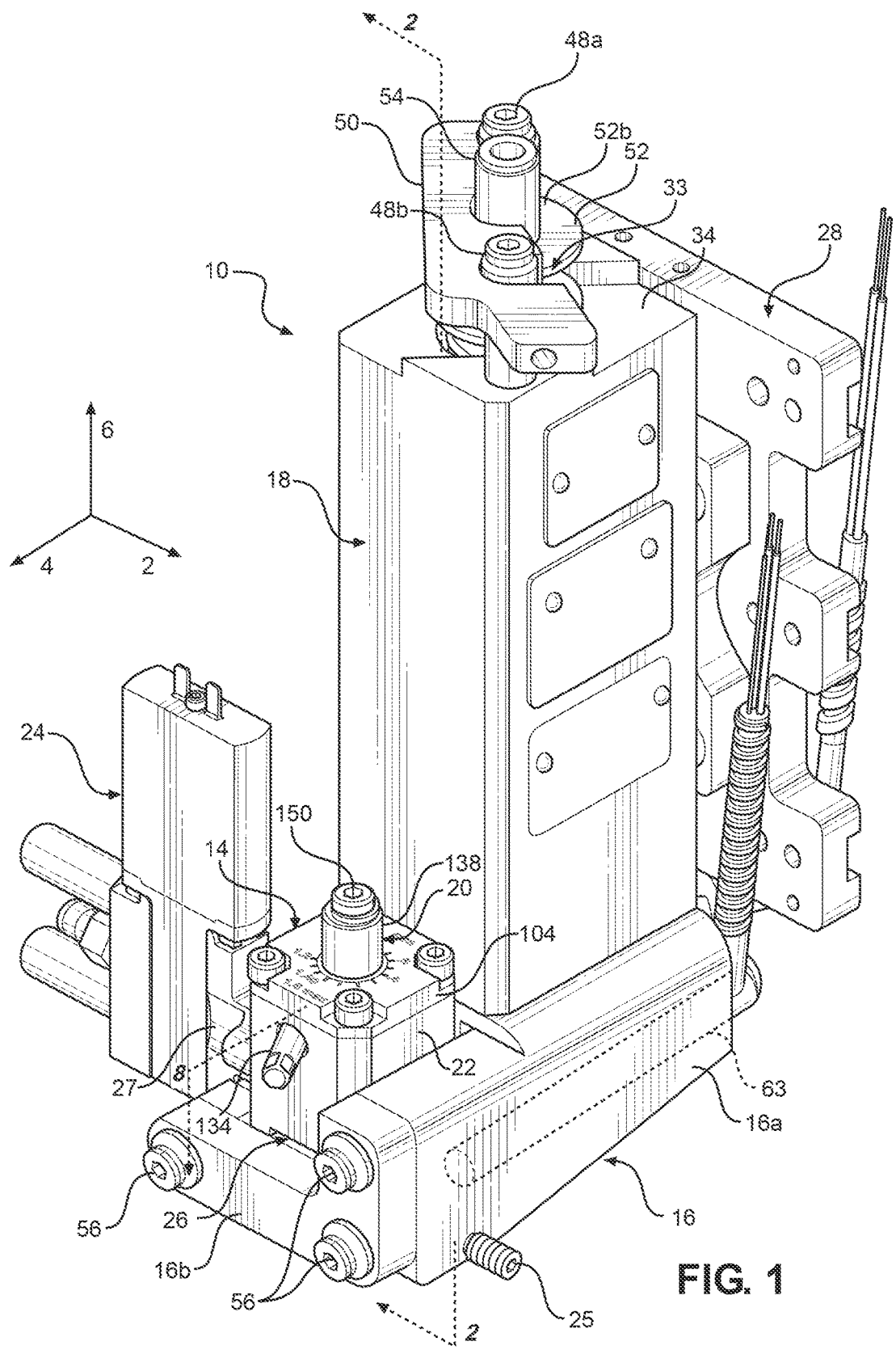
FIG. 1 is a perspective view of a dispenser according to an embodiment of the present disclosure.

Described herein is a dispenser 10 that includes a dispenser module 14, a heater block 16, an adhesive supply 18, and a stroke adjustment assembly 20. Certain terminology is used to describe the dispenser 10 in the following description for convenience only and is not limiting. The words "right", "left", "lower," and "upper" designate directions in the drawings to which reference is made. The words "inner" and "outer" refer to directions toward and away from, respectively, the geometric center of the description to describe the dispenser 10 and related parts thereof. The words "forward" and "rearward" refer to directions in a longitudinal direction 2 and a direction opposite the longitudinal direction 2 along the dispenser 10 and related parts thereof. The terminology includes the above-listed words, derivatives thereof and words of similar import.

Unless otherwise specified herein, the terms "longitudinal," "vertical," and "lateral" are used to describe the orthogonal directional components of various components of the dispenser 10, as designated by the longitudinal direction 2, lateral direction 4, and vertical direction 6. It should be appreciated that while the longitudinal and lateral directions 2, 4 are illustrated as extending along a horizontal plane, and the vertical direction 6 is illustrated as extending along a vertical plane, the planes that encompass the various directions may differ during use.

FIGS. 1-10 illustrate one embodiment of a dispenser 10 configured to dispense liquid adhesive, such as a highly cohesive hot melt adhesive, onto a substrate. For example, the dispenser 10 can be a non-contact dispenser capable of jetting or rapidly dispensing minute amounts (e.g., droplets) of PUR adhesive material or another type of highly cohesive thermoplastic material (hereinafter collectively referred to as hot melt adhesives) onto a substrate. In one operation, the dispenser 10 can be used to dispense hot melt adhesive into small, tight locations, such as grooves typically found in cell phone assemblies or other electronics, though use of the dispenser 10 is not to be construed as limited to this example.

With reference to FIG. 1, the dispenser 10 includes a dispenser module 14, a heater block 16 coupled to the dispenser module 14, and an adhesive supply 18 coupled to the heater block 16. The adhesive supply 18 can be a reservoir for receiving the adhesive, or the adhesive supply 18 could receive a pre-packaged adhesive such as a cartridge or syringe of adhesive. The dispenser module 14 may include a stroke adjustment assembly 20 extending into a main housing 22 that is coupled to the heater block 16. The main housing 22 of the dispenser module 14 can also be coupled to a solenoid valve 24 for dispensing the hot melt adhesive from the dispenser module 14, as will be discussed further below. The dispenser 10 can include a support structure 28 configured to support and move the dispenser 10 with respect to the respective substrate to which a hot melt adhesive is being applied. The support structure can be attached to the housing through screws or other similar fasteners.

Figure 2:
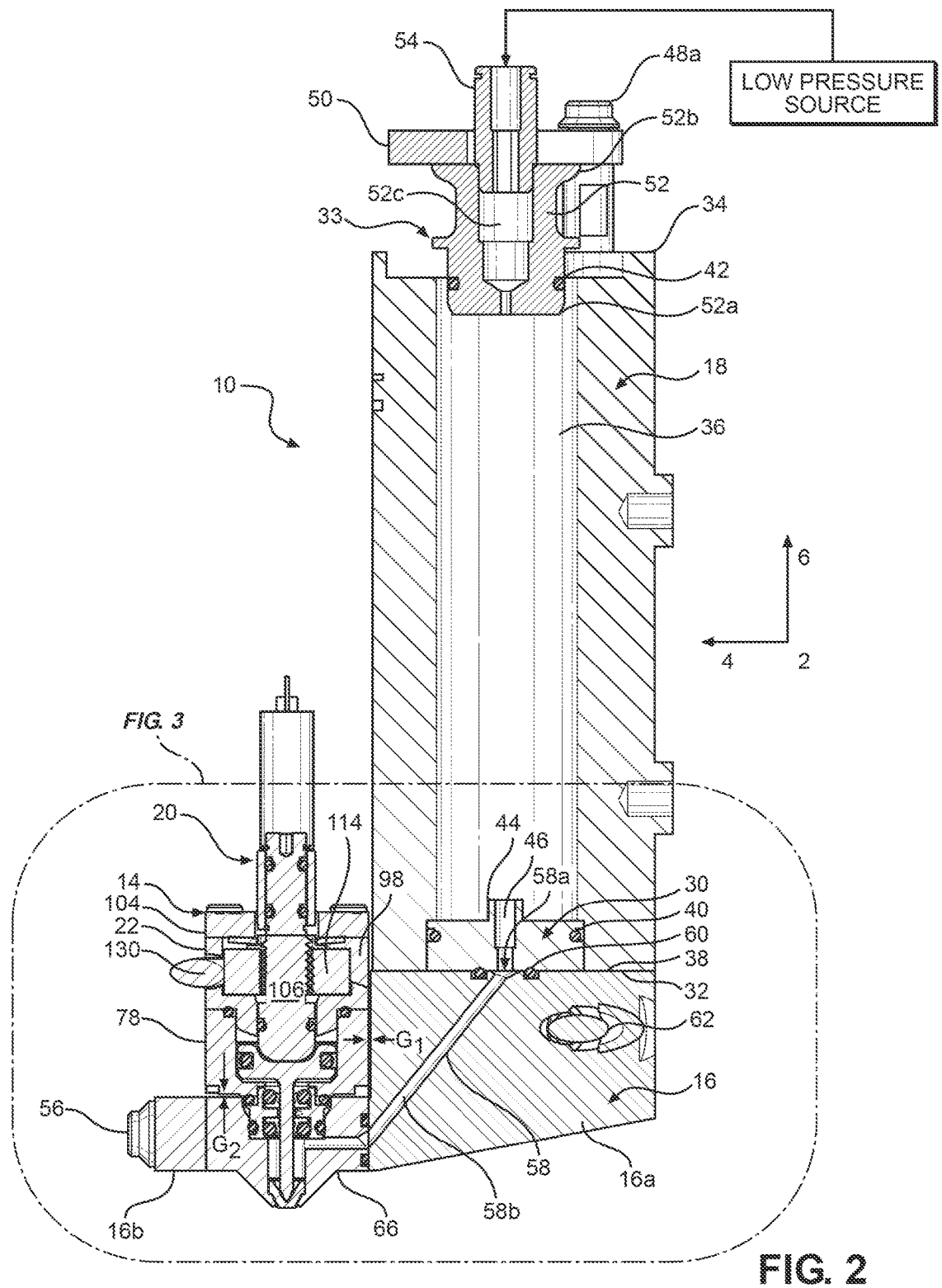
FIG. 2 is a cross-sectional view of the dispenser illustrated in FIG. 1, taken along line 2-2 in FIG. 1.
Figure 3:
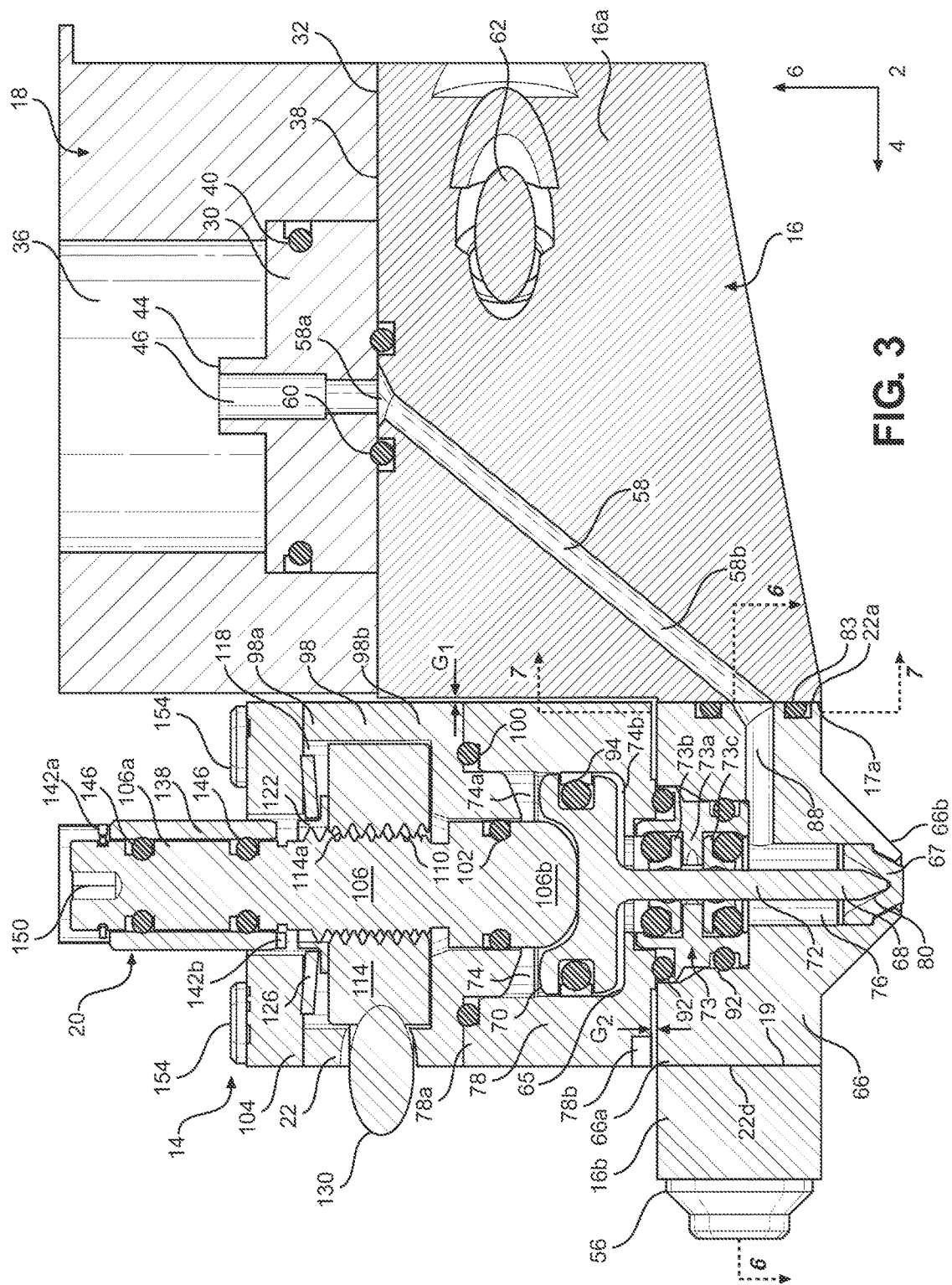
FIG. 3 is a cross-sectional view of a lower section of the dispenser of FIG. 1, noted by the encircled region in FIG. 2.

Continuing with FIGS. 1-3, the adhesive supply 18 can be adapted to receive a cartridge of adhesive (not shown). The adhesive supply 18 can include a cartridge adapter 30 at a bottom end 32, a plug locking assembly 33 at a top end 34 opposite the bottom end along the vertical direction 6, and a bore 36 for holding the cartridge or syringe of adhesive between the cartridge adapter 30 and the plug locking assembly 33. The bore 36 is depicted as extending substantially in the vertical direction 6, though other embodiments are contemplated. In alternative embodiments of the adhesive supply 18, the bore 36 may be supplied with liquid hot melt adhesive pumped into the adhesive supply 18, or alternatively with solid state hot melt adhesive from an automatic filling or feeding system, which would then be melted and pressurized in the bore 36. When the adhesive supply 18 is coupled to the heater block 16, the bottom end 32 and the cartridge adapter 30 may abut a surface 38 of the heater block 16. A first O-ring 40 in the cartridge adapter 30 and a second O-ring 42 in the plug member 52 seals the bore 36 from the external surroundings of the dispenser 10. The cartridge adapter 30 can include a port 44 extending upwards along the vertical direction 6, where the port 44 may be configured to pierce an adhesive cartridge positioned within the bore 36. The cartridge adapter 30 can also include an adapter passage 36 that extends through the cartridge adapter 30, and particularly the port 44, such that hot melt adhesive can flow from the adhesive cartridge in the bore 36 to the heater block 16.

After a cartridge of hot melt adhesive is placed within the bore 36, the plug locking assembly 33 is rotated into the closed position shown in FIGS. 1 and 2. The plug locking assembly 33 can include a pair of screw caps 48a, 48b that extend upwardly from opposing sides of the bore 36 along the vertical direction 6 at the top end 34 of the adhesive supply 18. The plug locking assembly 33 can also include a rotatable locking arm 50 pivotally engaged with the first screw cap 48a, as well as a plug member 52. The plug member 52 can include a bottom end 52a and a top end 52b opposite the bottom end 52a along the vertical direction. The bottom end 52a of the plug member 52 can retain the second O-ring 42 and is configured to be inserted into the bore 36 of the adhesive supply 18. The plug member 52 can also include an air passage 52c that extends from the top end 52b to the bottom end 52a. An air coupling 54 can be engaged with the top end 52b of the plug member 52, where the air coupling 54 allows pressurized air to be delivered from a low pressure source through the air coupling 52 and the air passage 52c to force hot melt adhesive from the bore 36, through the cartridge adapter 30, and into the heater block 16. The air coupling 54 can be attached to the top end 52b of the plug member 52 through a threaded connection, though other connection types are contemplated. The locking arm 50 can be rotated about the first screw cap 48a into and out of engagement with the second screw cap 48b and the air coupling 54 to selectively block removal of the plug member 52 from the bore 36. When an operator of the dispenser 10 wishes to insert a cartridge of hot melt adhesive into the bore 36 or switch cartridges, the operator can pivot the locking arm 50 about the first screw cap 48a away from the second screw cap 48b to enable removal of the plug member 52 and provide external access to the bore 36 for insertion, replacement, or removal of a cartridge. When a new cartridge has been inserted into the bore 36, the operator can then rotate the locking arm 50 about the first screw cap 48a towards the second screw cap 48b and the air coupling 54 such that the locking arm 50 engages the second screw cap 48b and the air coupling 54, thus blocking removal of the plug member 52 and thus securing the cartridge 36 within the bore. Though one particular structure is described above for securing a cartridge within the bore 36, it should be understood that alternative known biasing and locking structures can be utilized during operation of the dispenser 10 as desired.

Continuing with FIGS. 1-3, the heater block 16 can include a main block portion 16a and a clamping plate 16b coupled to the main block portion 16a through a plurality of fasteners 56. The fasteners 56 can be threaded bolts, screws, clamps, or any other suitable fasteners. The solenoid valve 24 can also be coupled to the main block portion 16a through a solenoid coupler 27. When the clamping plate 16b is attached to the main block portion 16a, the main block portion 16a and the clamping plate 16b can collectively define a cavity 26 configured to receive and secure the dispenser module 14 to the heater block 16, as will be described further below. The clamping plate 16b can be detached from the main block portion 16a so as to provide access to the dispenser module 14 for cleaning, repair, or replacement.

The main block portion 16a of the heater block 16 can include a heater block passage 58 that extends through the heater block 16 from the adhesive supply 18, particularly the cartridge adapter 30 disposed within the bore 36, to the dispenser module 14. The heater block passage 58 can be comprised of multiple sections, such as a hemispherical portion 58a adjacent the top surface 38 of the heater block 16 and a bore 58b extending from the hemispherical portion 58 to the first surface 17a of the heater block 16. Each portion of the heater block passage 58 can be devoid of elbows, curves, or sharp transitions so that the heater block passage 58 can be easily cleaned when the dispenser 10 is not in operation and the heater block 16 is decoupled from the dispenser 10. A seal 60 can be disposed between the cartridge adapter 30 and the heater block 16 to prevent hot melt adhesive from leaking out of the adapter passage 46 or the heater block passage 58. The heater block 16, and particularly the main block portion 16a, can be configured to receive a temperature probe 62 for providing feedback to the operator of the dispenser 10 regarding the temperature of hot melt adhesive in the heater block 16. The temperature probe 62 can extend through the main block portion 16a and towards the heater block passage 58 to detect the temperature of the hot melt adhesive flowing through the heater block passage 58. The temperature probe 62 is a conventional temperature sensor. In one embodiment, the temperature probe 62 is a nickel-based sensor.

The main block portion 16a can also receive a conventional heater cartridge 63 that is configured to deliver heat to the hot melt adhesive through the heater block 16 and the adhesive supply 18, as well as to the dispenser module 14, which will be discussed further below. The heater cartridge 63 can heat the hot melt adhesive to within a desired operating range, which can be from about 225 degrees Fahrenheit to about 275 degrees Fahrenheit. As a result, the dispenser module 14, heater block 16, and adhesive supply 18 are configured to transfer heat energy from the heater cartridge 63 such that a separate heating element on the dispenser module 14 is not required. This operating temperature maintains the hot melt adhesive in a molten state throughout the dispensing process.

With further reference to FIGS. 1-5, the main housing 22 of the dispenser module 14 includes a bore 65 that extends substantially along the vertical direction 6 and a valve member 68 partially extending through the bore 65. The main housing 22 can include a nozzle body 66 that extends from an upper portion 66a to a lower portion 66b along the vertical direction 6, and a central valve body 78 positioned above the nozzle body 66 that extends from an upper portion 78a to a lower portion 78b along the vertical direction 6. The central valve body 78 and the nozzle body 66 are releasably coupled to each other, such as through threaded engagement, press-fit, connection via fasteners, or any other suitable connection means. Each of the nozzle body 66 and the valve body 78 at least partially define the bore 65. The valve member 68 includes a piston portion 70 and a needle 72 extending distally from the piston portion. Though depicted as defining an integral structure, the piston portion 70 and needle 72 can alternatively be releasably coupled together. The valve member 68 can be formed from stainless steel, particularly hardened 400 series stainless steel, though other materials are contemplated.

The dispenser module 14 can also include a seal pack 73 inserted into the bore 65 of the main housing 22, particularly into a recess 75 defined by the upper portion 66a of the nozzle body 66. The seal pack 73 can be positioned such that it divides the bore 65 into two sections—a pneumatic piston chamber 74 defined by the valve body 78 and an adhesive chamber 76 defined by the nozzle body 66. The pneumatic piston chamber 74 can be configured to receive the piston portion 70 of the valve member 68, and the adhesive chamber 76 can be configured to receive the needle 72 of the valve member 68. As a result, the needle portion 72 can extend from the piston portion 70 disposed within the pneumatic piston chamber 74, through the seal pack 73, and into the adhesive chamber 76. The seal pack 73 can include a central body member 73a, an upper dynamic seal member 73b in communication with the pneumatic piston chamber 74, and a lower dynamic seal member 73c in communication with the adhesive chamber 76 and spaced from the upper dynamic seal member 73b along the vertical direction 6. The needle 72 of the valve member 68 is configured to extend through each of the central body member 73a, upper dynamic seal member 73b, and lower dynamic seal member 73c as it extends from the pneumatic piston chamber 74 to the adhesive chamber 76. The seal pack 73, and specifically the upper and lower dynamic seal members 73b, 73c can thus function to prevent hot melt adhesive from the adhesive chamber 76 from leaking into the pneumatic piston chamber 74, and likewise prevent pressurized air from the pneumatic piston chamber 74 from leaking into the adhesive chamber 76. The seal pack 73 is held in position within the recess 75 by the lower portion 78b of the valve body 78. However, the seal pack 73 can also be threadedly engaged to the nozzle body 66, attached via an external clamp, or any other known method of coupling the seal pack 73 to the nozzle body 66. The seal pack 73 can also include a plurality of seals 92 positioned between the central body member 73a and the nozzle body 66 to provide additional protection against pressurized air and hot melt adhesive escaping from the pneumatic piston chamber 74 and the adhesive chamber 76, respectively.

The nozzle body 66 can include a nozzle insert 67 disposed within the adhesive chamber 76. The nozzle insert 67 can define a valve seat 80, an outer surface 84, and a valve orifice 82 that extends from the valve seat 80 to the outer surface 84. The valve seat 80 can be shaped complementary to the shape of the distal end of the needle 72 of the valve member 68. The valve orifice 82 can define an opening for hot melt adhesive to exit the adhesive chamber 76 upon actuation of the valve member 68, as will be described further below. The nozzle insert 67 can be sized so that it can be press fit within the adhesive chamber 76, such that the outer surface 84 of the nozzle insert 67 is seated against an inner surface 85 of the nozzle body 66. The nozzle insert 67 can be comprised of a material that has a high durability to withstand repeated impacts from the needle 72 of the valve member 68. The nozzle insert 67 can also be brazed or soldered to the nozzle body 66 at the interface between the outer surface 84 of the nozzle insert 67 and the inner surface 85 of the nozzle body 66. Brazing or soldering the nozzle insert 67 to the nozzle body 66 can increase heat transfer to the nozzle insert 67 without compromising structural integrity. In addition to the valve orifice 82, the nozzle body 66 and main block portion 16a of the heater block 16 can define a flush port (not shown) that allows for easy access to the adhesive chamber 76 for cleaning or flushing hot melt adhesive from the nozzle body 66. The flush port can be plugged by a flush port screw 25 (FIG. 1) that can be easily inserted and removed from the flush port.

Continuing with FIGS. 2-5, the nozzle body 66 includes an inlet passage 88 that extends from a first surface 22a of the main housing 22 to the adhesive chamber 76. The inlet passage 88 can be in direct fluid communication with the heater block passage 58, particularly the bore 58b, such that hot melt adhesive exiting the cartridge disposed within the bore 36 of the adhesive supply 18 can flow through the adapter passage 46 of the cartridge adapter 30, through the heater block passage 58 of the heater block 16, through the inlet passage 88, into the adhesive chamber 76, and out of the nozzle body 66 through the valve orifice 82 of the nozzle insert 67 upon actuation of the valve member 68. An O-ring 83 can be disposed around the inlet of the inlet passage 88 between the first surface 22a of the main housing 22 and the first inner surface 17a of the heater block 16 to prevent hot melt adhesive from leaking out of the heater block passage 58 and the inlet passage 88.

The pneumatic piston chamber 74 within the valve member 68 is divided into an upper piston chamber 74a and a lower piston chamber 74b spaced distally along the vertical direction 6. The lower piston chamber 74b is spaced from the upper piston chamber 74a by the piston portion 70 of the valve member 68. The upper piston chamber 74a can be bounded at the upper end by the adjustment housing 98 of the stroke adjustment assembly 20, which will be described further below, while the lower piston chamber 74b can be bounded by the lower end of the central valve body 78 and the seal pack 73. The main housing 22 includes an upper air inlet (not shown) in communication with the upper piston chamber 74a and an upper outlet of the solenoid valve 24 and a lower air inlet (not shown) in communication with the lower piston chamber 74b and a lower outlet of the solenoid valve 24. The piston chamber 74 can be sealed from the external surroundings by any number of seals disposed between the main housing 22, particularly the central valve body 78, and the solenoid vale 24. Further, the piston portion 70 of the valve member 68 can include a piston seal 94 disposed around the piston portion 70 and in contact with the inner surface of the central valve body 78 to prevent air migration between the upper piston chamber 74a and the lower piston chamber 74b.

Figure 5:
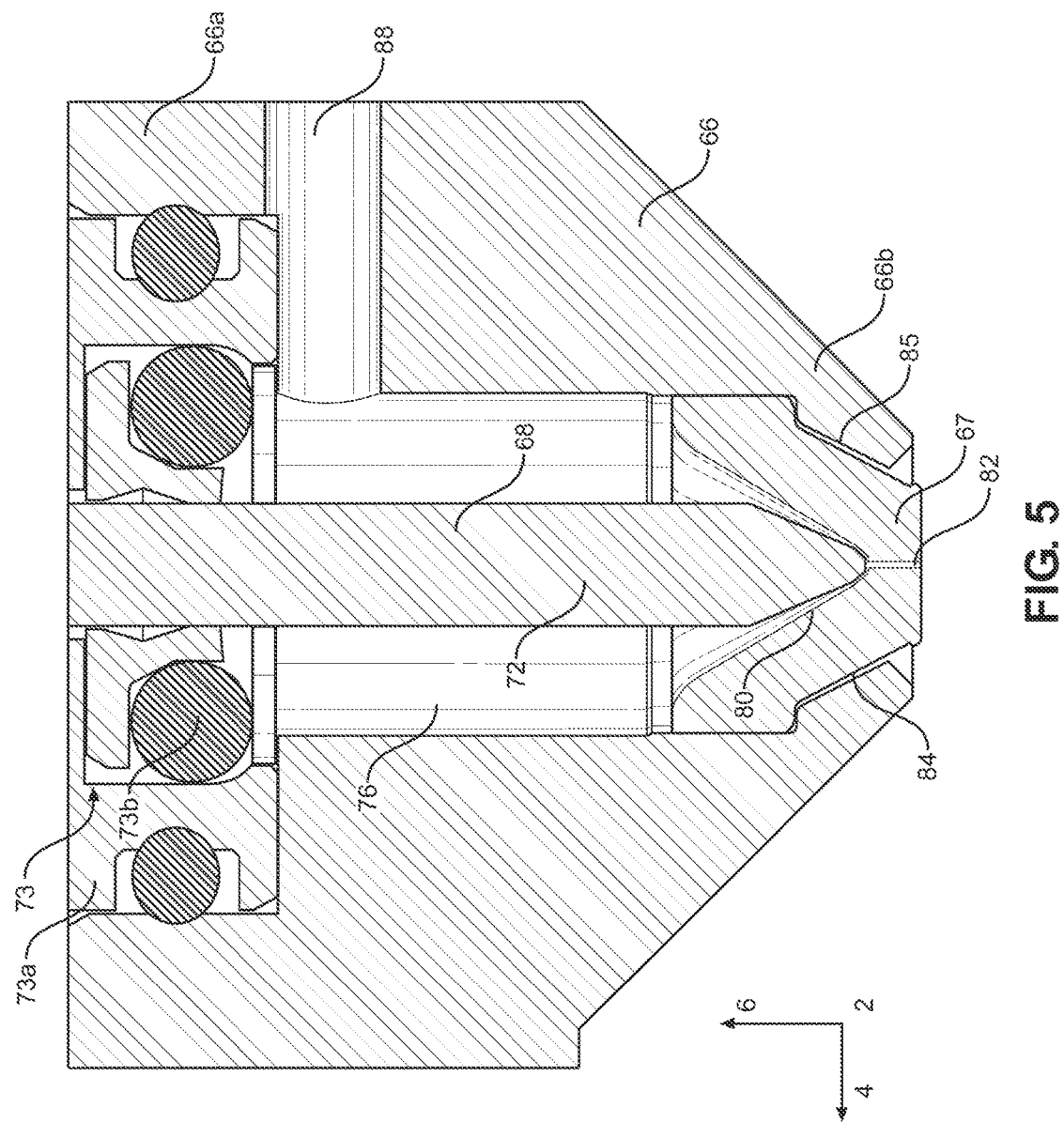
FIG. 5 is a cross-sectional view of the nozzle body of the dispenser of FIG. 1, noted by the encircled region in FIG. 4.
Figure 6:
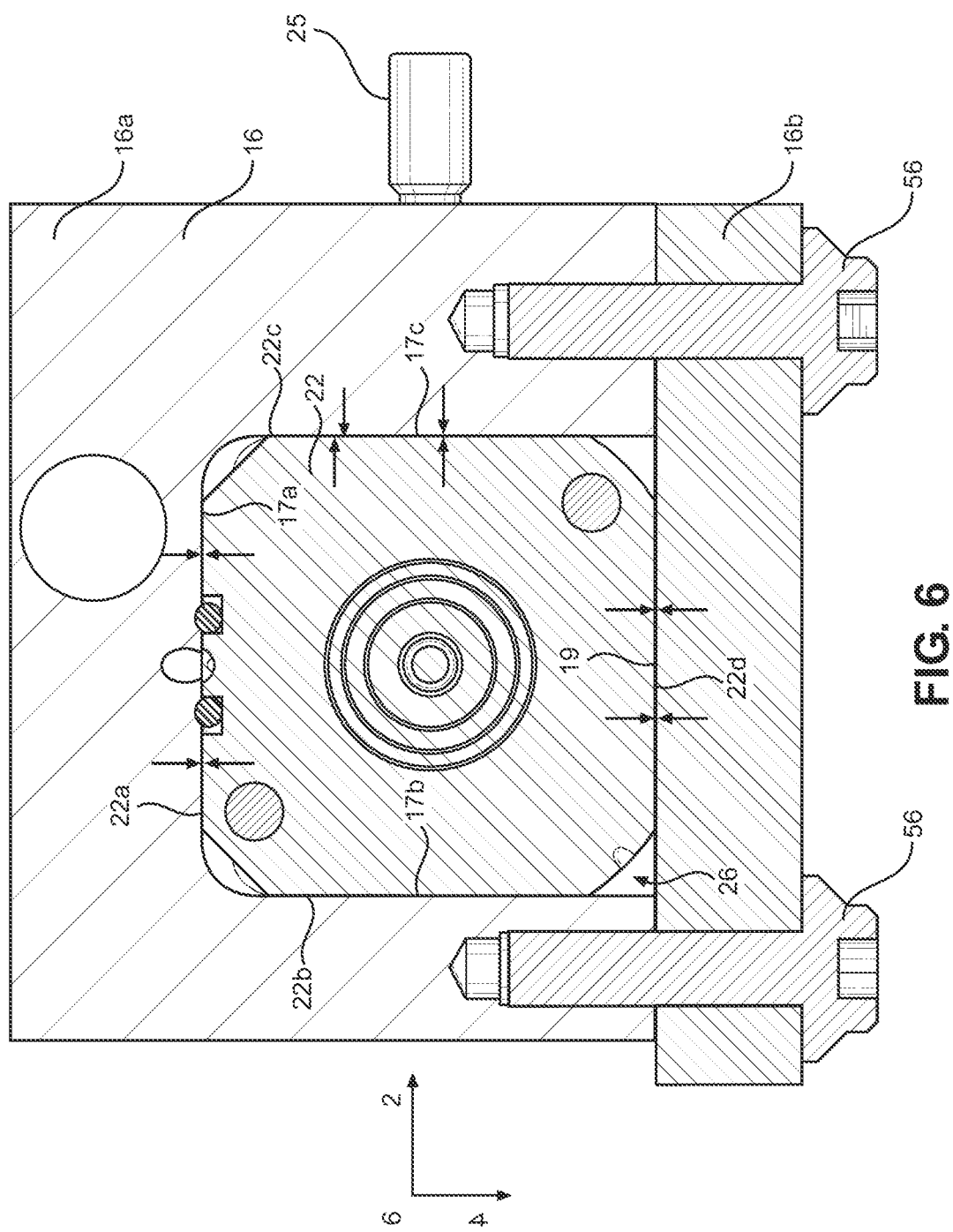
FIG. 6 is a cross-sectional view of a lower section of the dispenser of FIG. 1 taken along line 6-6 in FIG. 3.

Continuing with FIGS. 5 and 6, the dispenser module 14 is attached to the dispenser 10, and particularly the heater block 16, through a clamping relationship between the main block portion 16a and the clamping plate 16b of the heater block 16 and the nozzle body 66 of the dispenser module 14. The main block portion 16a of the heater block 16 defines a first surface 17a, a second surface 17b, and a third surface 17c opposite the second surface 17b along the longitudinal direction 2. The clamping plate 16b defines a first surface 19 that is opposite the first surface 17a of the main block portion 16a along the lateral direction 4. Collectively, when the clamping plate 16b is attached to the main block portion 16a, the first, second, and third surfaces 17a, 17b, 17c and the first surface 19 of the clamping plate 16b define the cavity 26 for receiving the nozzle body 66 of the dispenser module 14. The nozzle body 66 defines a first surface 22a, a second surface 22b, a third surface 22c opposite the second surface 22b along the longitudinal direction 2, and a fourth surface 22d opposite the first surface 22a along the lateral direction 4. The first, second, third, and fourth surfaces 22a-22d can collectively define the outer surface of the nozzle body 66.

To attach the dispenser module 14 to the heater block 16, the clamping plate 16a must first be detached from the main block portion 16b. By partially unthreading the fasteners 56, the clamping plate 16a can be completely removed from the main block portion 16a or removed from the main block portion 16a to such an extent so as to allow the dispenser module 14 to be inserted into the cavity 26. After the nozzle body 66 is inserted into the cavity 25, the clamping plate 16a can be fully reattached to the main block portion 16b by tightening the fasteners 56. When the fasteners 56 are fully tightened, the clamping plate 16b applies a force to the nozzle body 66 that secures the dispenser module 14 to the heater block 16. In particular, when fully assembled (as shown in FIG. 6), the first surface 22a of the nozzle body 66 contacts the first surface 17a of the main block portion 16a, the second surface 22b of the nozzle body 66 contacts the second surface 17b of the main block portion 16a, the third surface 22c of the nozzle body 66 contacts the third surface 17c of the main block portion 16a, and the fourth surface 22d of the nozzle body 66 contacts the first surface 19 of the clamping plate 16b. As a result, a force is applied to the nozzle body 66 as a result of the clamping relationship formed between the main block portion 16a and clamping plate 16b of the heater block 16, as indicated by the coupled arrows in FIG. 6. This force ensures that the clamping plate 16a and the main block portion 16b maintain constant contact with each side of the nozzle body 66. Additionally, the clamping relationship between the heater block 16 and the nozzle body 66 enables efficient heat transfer from the heater block 16 to the nozzle body 66 to keep the hot melt adhesive within the nozzle body 66 at an elevated temperature.

Figure 7:
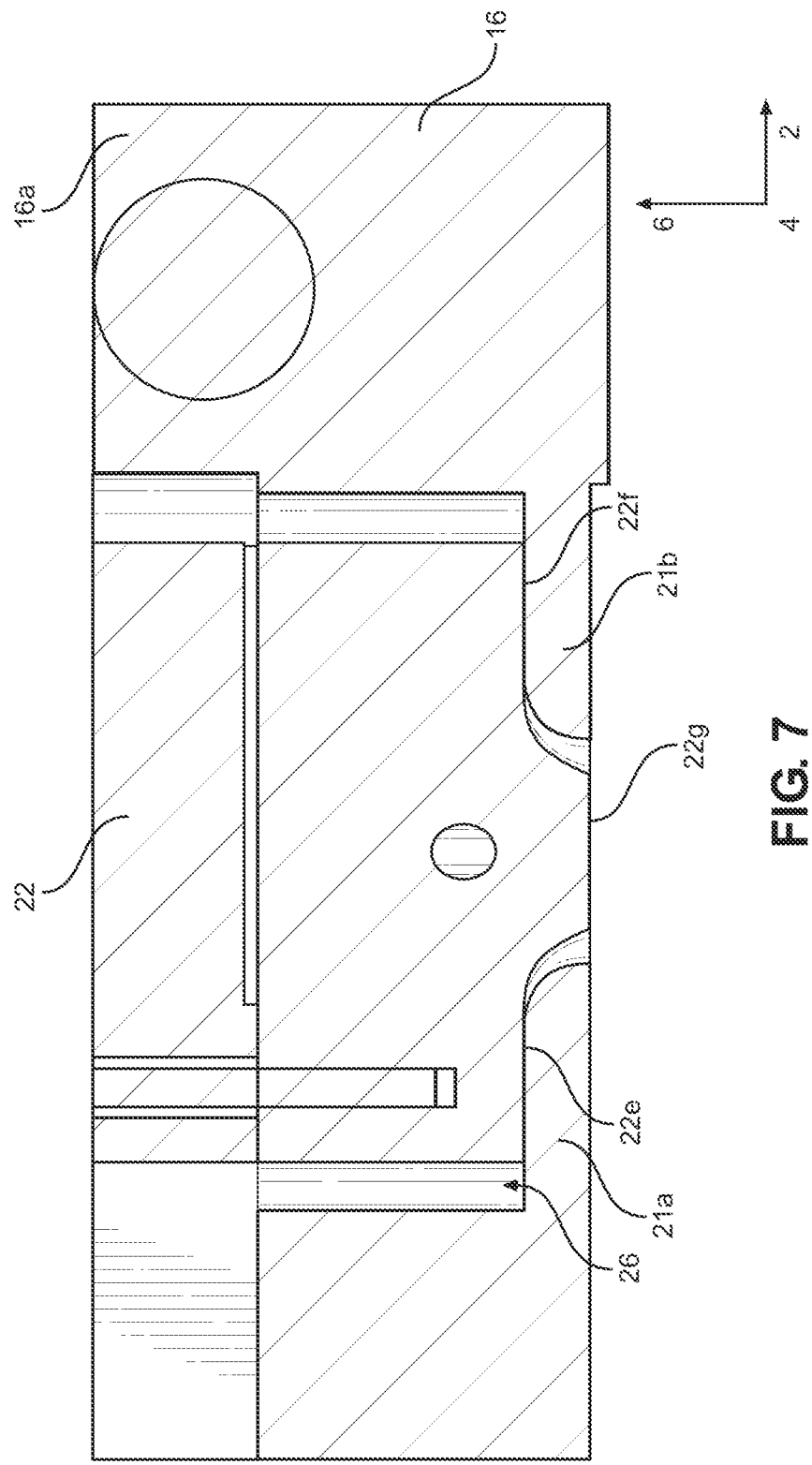
FIG. 7 is a cross-sectional view of a lower section of the dispenser of FIG. 1 taken along the line 7-7 in FIG. 3.

Now referring to FIG. 7, the nozzle body 66 defines a bottom surface 22g that extends between the first, second, third, and fourth surfaces 22a-22d. The nozzle body 66 can also define a first recess 22e and a second recess 22f, where the first recess 22e extends from the first and second surfaces 22a, 22b to the bottom surface 22g, and the second recess 22f extends from the first and third surfaces 22a, 22c to the bottom surface 22g. The first recess 22e can be spaced opposite the second recess 22f on the nozzle body 66 along the longitudinal direction 2, though other positions are contemplated. The main block portion 16a of the heater block 16 can define a first ledge 21a and a second ledge 21b that each extend from the main block portion 16a along the lateral direction 4. The first and second recesses 22e, 22f, can each be configured to engage the first and second ledges 21a, 21b, respectively. Engagement between the first and second recesses 22e, 22f and the first and second ledges 21a, 21b aids the operator of the dispenser 10 in ensuring the nozzle body 66 is properly positioned within the cavity 26 during attachment of the dispenser module 14 to the heater block 16.

Referring to FIGS. 2-3, the nozzle body 66 is the only portion of the dispenser module 14 that directly contacts the heater block 16 when the nozzle body 66 is attached to the heater block 16. As a result, the central valve body 78 is entirely spaced from the heater block 16. The central valve body 78 defines a surface 79 that faces the main block portion 16a of the heater block 16 when the dispenser module 14 is attached to the heater block 16. The surface 79 is spaced from the main block portion 16 along the lateral direction 4 by a first gap $G_1$. The first gap $G_1$ extends along the entirety of the central valve body 78, and may be substantially constant along its length. The first gap $G_1$, which may also be referred to as a relief cut between the central valve body 78 and the main block portion 16a, provides a thermal barrier between the main block portion 16a and the central valve body 78 to greatly limit the magnitude of heat transferred from the main block portion 16a to the central valve body 78.

In addition to the gap $G_1$, the lower portion 78b of the central valve body 78 can include a bottom surface 78b that is spaced from the upper portion 66a of the nozzle body 66 by a second gap $G_2$. The bottom surface 78b, and thus the second gap $G_2$, can extend around a substantial majority of the central valve body 78, with the exception of the area surrounding the bore 65 where the central valve body 78 and the nozzle body 66 interface. While the first gap $G_1$ provides a thermal gap between the central valve body 78 and the main block portion 16a of the heater block 16, the second gap $G_2$ provides a thermal barrier between the central valve body 78 and the nozzle body 66 to greatly limit the magnitude of heat transferred from the nozzle body 66 to the central valve body 78. Because of the first and second gaps $G_1$, $G_2$, the central valve body 78 is substantially isolated from the heater block 16 and the adhesive supply 18, and the sole area of contact between the central valve body 78 and the nozzle body 66 is the area immediately surrounding the bore 65 at the interface between the central valve body 78 and the nozzle body 66.

As the central valve body 78 and the nozzle body 66 can define individual body portions, each of the central valve body 78 and the nozzle body 66 can be comprised of different materials. For example, the central valve body 78 can be comprised of a first material and the nozzle body 66 can be comprised of a second material. In one embodiment, the first and second materials are different, and in particular the second material has a higher thermal conductivity than the first material. For example, the first material is tool steel and the second material is a copper alloy. However, other material combinations are contemplated. In an embodiment where the second material has a higher thermal conductivity than the first material, thermal conduction between the nozzle body 66 and the central valve body 78 can be limited while ensuring a consistent thermal gradient across the nozzle body 66.

By directly clamping the nozzle body 66 to the heater block 16 and maintaining a high number of contact points between the heater block 16 and the nozzle body 66, the dispenser 10 can be operated with little variation in heat gradients from the heater cartridge 62 to the nozzle body 66. A low variation in the heat gradient ensures that the hot melt adhesive will maintain a consistent temperature, and thus a consistent viscosity, from the adhesive supply 18 until the time the hot melt adhesive flows through the valve orifice 82 of the nozzle insert 67, leading to low variability in application characteristics. This objective is furthered by the inclusion of the first and second gaps $G_1$, $G_2$, between the central valve body 78 and both the heater block 16 and the nozzle body 66, as well as designing the central valve body 78 and the nozzle body 66 from different materials. These features allow for a high level of thermal isolation of the central valve body 78 from the heater block 16 and the nozzle body 66, thus increasing the thermal concentration within the nozzle body 66 and improving overall dispensing performance.

Continuing with FIGS. 2-4 and 8-10, actuation of the valve member 68 and adjustment of the stroke length will be discussed further. The solenoid valve 24 is a known air valve that alternatively supplies pressurized air to the upper piston chamber 74a and the lower piston chamber 74b to move the piston portion 70 upward and downward within the pneumatic piston chamber 74, which translates the needle 72 between a retracted position and an extended position. As a result, the distal end of the needle 72 comes into and out of engagement with the valve seat 80, thereby repeatedly opening and closing the valve orifice 82. The pressure formed by the movement of the valve member 68 from the retracted position to the extended position, and the impact of the needle 72 against the valve seat 80, forces the highly cohesive hot melt adhesive to completely break away from the valve orifice 82 to form an elongated droplet. Consequently, the dispenser 10 can jet discrete amounts of hot melt adhesive from the nozzle body 66 towards a substrate along a direction of travel. Downward movement of the valve member 68 to the extended position is thus limited by the valve seat 80, while upward movement of the valve member 68 to the retracted position is limited by the lower end 106b of the adjustment rod 106, which will be discussed further below. The distance between the retracted position and the extended position of the valve member 68 is referred to as the stroke length of the valve member 68. The stroke length of the valve member 68 can be adjusted using the stroke adjustment assembly 20, which will be described below. It will be understood that the end of the needle 72 of the valve member 68 can be formed with a different shape than that depicted in this embodiment of the dispenser 10. Additionally, although the movement of the valve member 68 is controlled pneumatically using the piston 70 and the solenoid valve 24 in the illustrated embodiment, other embodiments of the dispenser 10 may include alternative devices for causing reciprocating movement of the valve member 68, including but not limited to a piezoelectric device or an electric motor and armature.

The stroke adjustment assembly 20 includes an adjustment housing 98 that includes an upper end 98a and a lower end 98b opposite the upper end 98a along the vertical direction 6, where the lower end 98b is attached to the upper end 78a of the central valve body 78. The stroke adjustment assembly 20 also includes an adjustment rod 106 having a lower end 106b and an upper end 106a opposite the lower end along the vertical direction 6, where the lower end 106b extends into the upper piston chamber 74a and directly contacts the piston 70 of the valve member 68 when the valve member 68 is in the retracted position. As a result, the lower end 106b of the adjustment rod 106 functions to control the upward movement of the piston 70 when the valve member 68 is in the retracted position, and thus control the stroke length of the valve member 68. The lower end 106b of the adjustment rod 106 can be formed form a material capable of withstanding the repeated impacts of the piston portion 70 of the valve member 68 against the adjustment rod 106. A seal 100 can be disposed between the lower end 98b of the adjustment housing 98 and the upper end 78a of the central valve body 78 and a seal 102 can be disposed around the lower end 106b of the adjustment rod 106 between the adjustment rod 106 and the adjustment housing 98 to prevent pressurized air from leaking out of the pneumatic piston chamber 74 and into the stroke adjustment assembly 20 or the environment external to the dispenser 10.

The adjustment housing 98 includes an adjustment chamber 118 configured to receive a portion of the adjustment rod 106. The adjustment chamber 118 can extend from the lower end 98b of the adjustment housing 98 to the upper end 98a, and can be bounded on the upper end by a top plate 104 that is releasably coupled to the adjustment housing 98. In the depicted embodiment, the top plate 104 can be attached to the adjustment housing by a plurality of bolts 154. However, any similar fastener can be used to secure the top plate 104 to the adjustment housing 98 as desired. The adjustment chamber 118 can contain a locking collar 114 disposed around the adjustment rod 106. The locking collar 114 can include a plurality of internal threads 114a and the adjustment rod can include a plurality of external threads 110, where engagement between the internal and external threads 114a, 110 controls the ability of the stroke adjustment assembly 20 to change the stroke length of the valve member 68, as will be described further below.

Figure 9A:
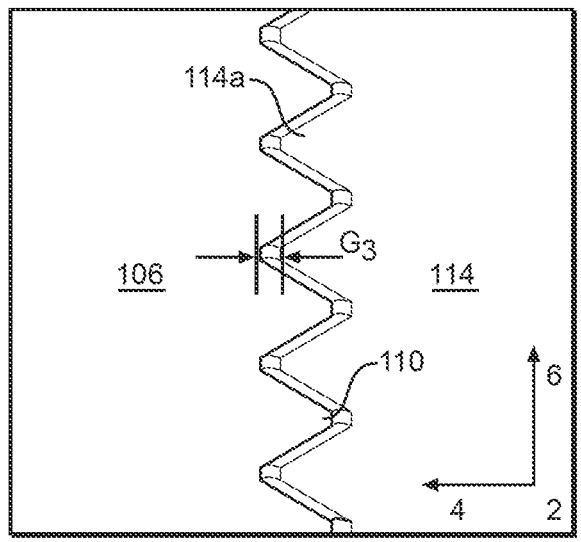
FIG. 9A is a cross-sectional view of the locking collar and adjustment rod of the dispenser of FIG. 1, with the locking collar in the unlocked configuration.
Figure 9B:
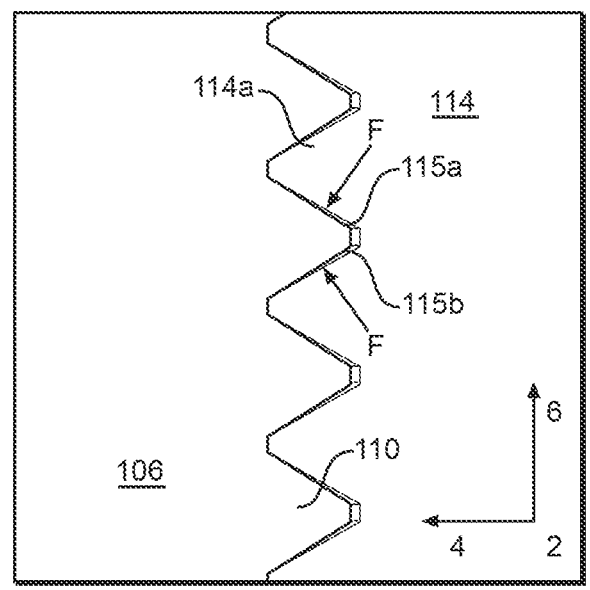
FIG. 9B is a cross-sectional view of the locking collar and adjustment rod of the dispenser of FIG. 1, with the locking collar in the locked configuration.

Continuing with FIGS. 9A and 9B, to control operation of the stroke adjustment assembly 20, the locking collar 114 can be actuated between a locked configuration and an unlocked configuration. In the locked configuration (shown in FIG. 9B), the locking collar is compressed around the adjustment rod 106, thus causing the internal threads 114a of the locking collar 114 to apply a locking force F to the external threads 110 of the adjustment rod 106. As a result, no space exists between the internal threads 114a of the locking collar 114 and the external threads 110 of the adjustment rod 106. Specifically, each of the external threads 110 of the adjustment rod 106 defines an upper surface 115a and a lower surface 115b opposite the upper surface 115a along the vertical direction 6. When the locking collar 114 is in the locked configuration, the internal threads 114a of the locking collar 114 apply the locking force F simultaneously to both the upper surface 115a and the lower surface 115b of each of the internal threads 114a. Due to the locking force F, the adjustment rod 106 is prevented from moving, both rotationally and axially, relative to the locking collar 114. In the unlocked configuration (shown in FIG. 9A), the locking collar is no longer compressed around the adjustment rod 106, and the internal threads 114a of the locking collar 114 no longer apply the locking force F to the external threads 110 of the adjustment rod 106. As a result, a gap $G_3$ exists between internal threads 114a of the locking collar 114 and the external threads 110 of the adjustment rod 106. Due to the lack of a locking force F, the adjustment rod 106 is capable of moving both rotationally and axially relative to the locking collar 114. The means for moving the adjustment rod 106 will be described further below.

Figure 8:
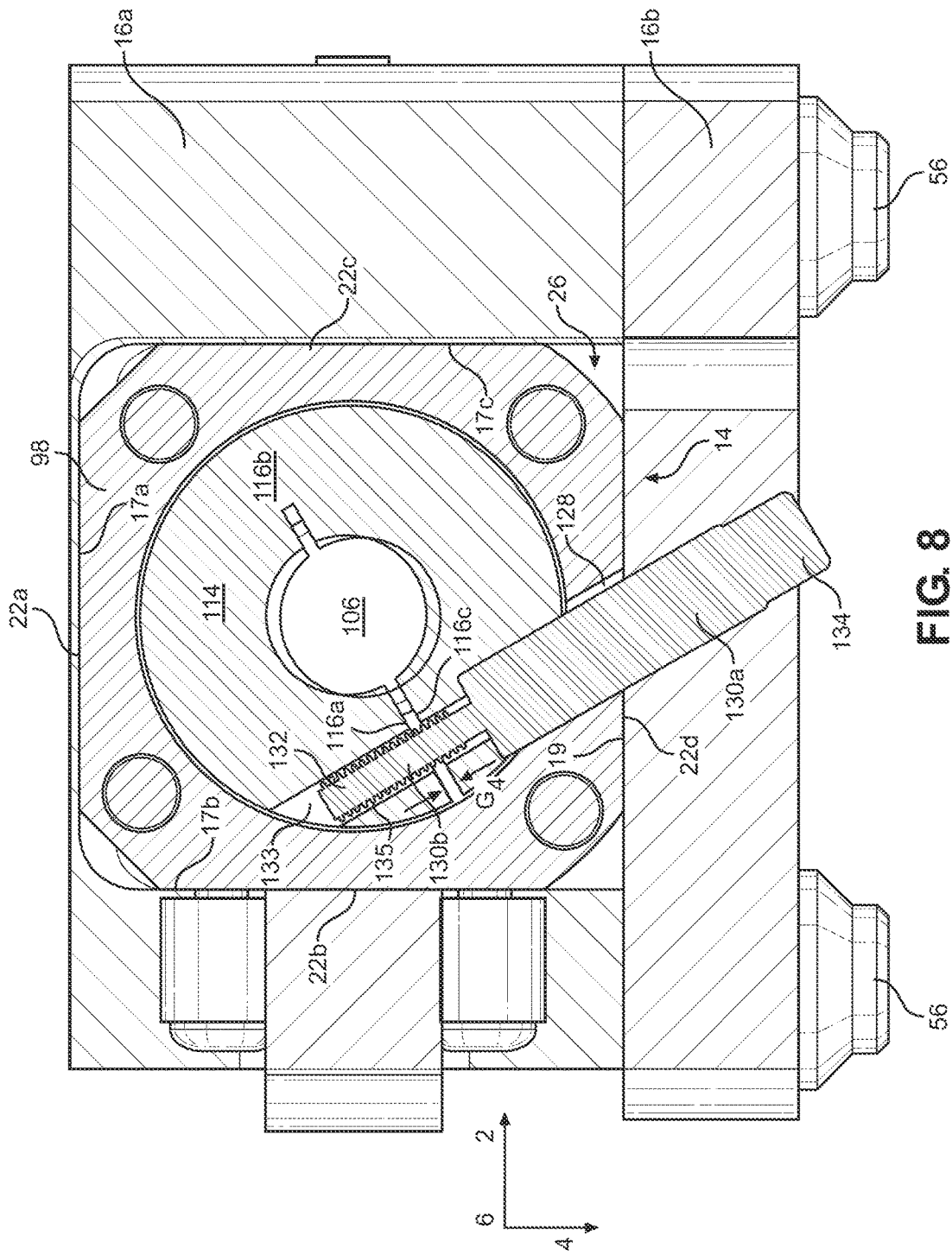
FIG. 8 is a cross-sectional view of the dispenser module of the dispenser of FIG. 1, taken along line 8-8 in FIG. 1.

Referring to FIGS. 8-9B, the adjustment housing 98 includes a bore 128 that extends from the outer surface of the adjustment housing 98 to the adjustment chamber 118. The stroke adjustment assembly 20 includes a locking screw 130 that extends through the bore 128 and engages the locking collar 114. The locking screw 130 extends from a threaded portion 130a that engages the locking collar 114 within the adjustment chamber 118 to a shaft portion 130b that extends through the bore 128 to a location external to the adjustment chamber 118. Though depicted as extending completely through the bore 128 to a location external to the adjustment housing 98, in alternative embodiments the shaft portion 130b of the locking screw may extend only partially through the bore 128. The shaft portion 130b can also include a hex handle 134 for easier actuation by an operator of the dispenser 10. Though a hex handle 134 is explicitly described, the shaft portion can include any other variety of handle that can be utilized by an operator of the dispenser for manual and/or automated actuation of the locking screw 130. The threaded portion 130a can extend through a bore 133 that extends through a portion of the locking collar 114, and includes a plurality of external threads 132 configured to engage corresponding internal threads 135 defined in the bore 133.

The locking collar 114 can be configured substantially as a C-shape. As such, the locking collar 114 can include a first surface 116a, a second surface 116c facing the first surface 116a, and a body 116b that extends from the first surface 116a to the second surface 116c. As the body 116b of the locking collar 114 defines a C-shape, a gap $G_4$ can separate the first surface 116a from the second surface 116c. The bore 128 can extend through the locking collar 114 such that the bore 128 extends through both the first and second surfaces 116a, 116c, and thus the gap $G_4$. Likewise, the threaded portion 130a of the locking screw 130 can extend through the first and second surfaces 116a, 116c and the gap $G_4$.

Actuation of the locking screw 130 functions to transition the locking collar 114 from the locked configuration to the unlocked configuration. By rotating the locking screw 130 in a first rotational direction, the external threads 132 of the locking screw 130 engage the internal threads 135 of the bore 133 of the locking collar 114 to compress the locking collar 114 into the locked configuration. When the locking collar 114 compresses, the first surface 116a of the locking collar 114 is pulled closer to the second surface 116c, which likewise decreases the distance of the gap $G_4$. Additionally, as noted above, in the locked configuration the locking collar is compressed around the adjustment rod 106, thus causing the internal threads 114a of the locking collar 114 to apply a locking force F to the external threads 110 of the adjustment rod 106. By rotating the locking screw 130 in a second rotational direction that is opposite the first rotational direction, the external threads 132 of the locking screw 130 engage the internal threads 135 of the bore 133 of the locking collar 114 to expand the locking collar 114 into the unlocked configuration. The first and second rotational directions can each be either a clockwise direction or a counterclockwise direction, depending on the orientation of the external threads 132 of the locking screw 130 and the internal threads 135 of the locking collar 114. Though a locking screw 130 that threadedly engages the locking collar 114 is explicitly described to transition the locking collar 114 from the locked configuration to the unlocked configuration, other suitable devices for locking and unlocking the locking collar 114 are contemplated.

Figure 4:
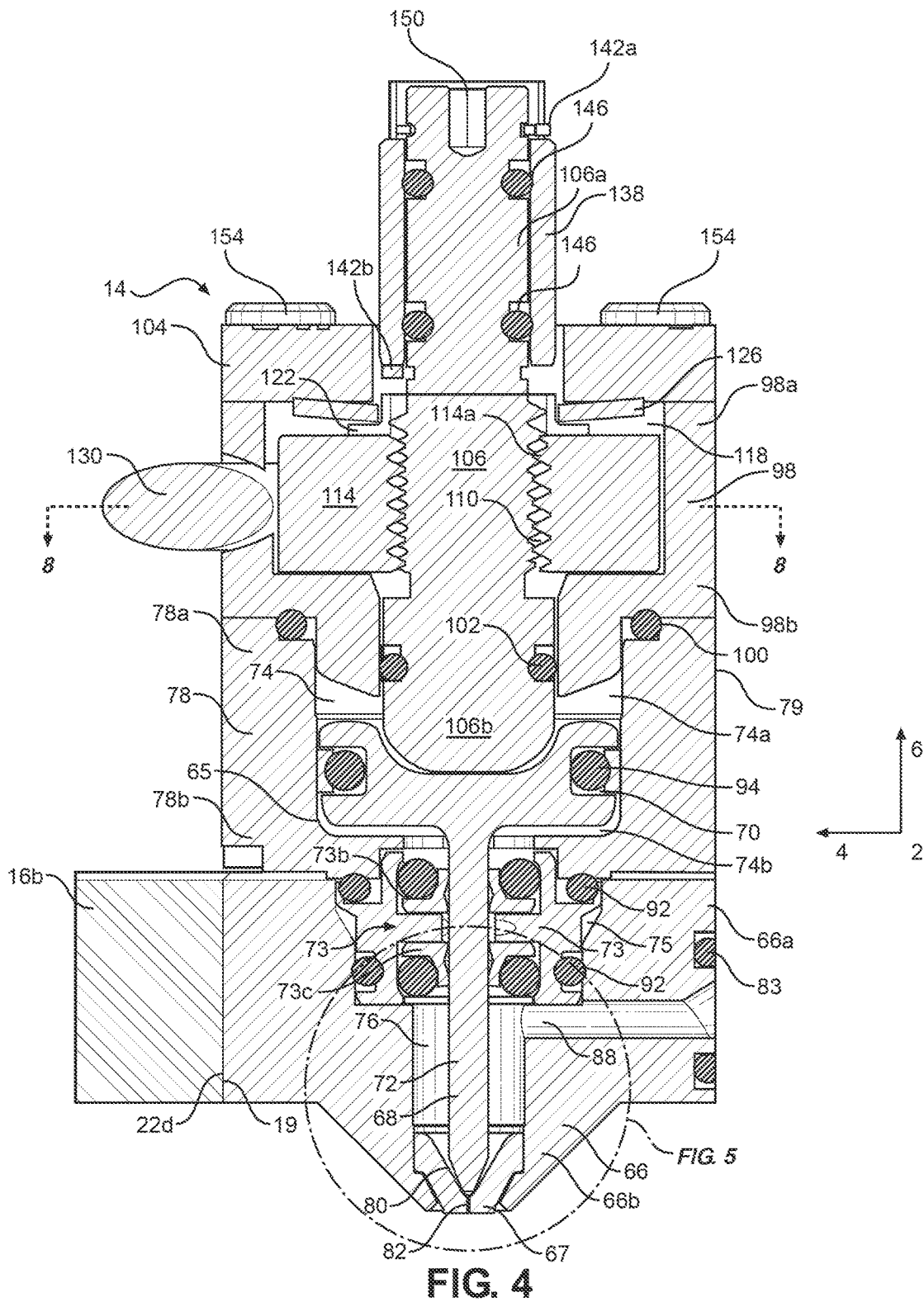
FIG. 4 is a cross-sectional view of the dispenser module of the dispenser of FIG. 1, taken along the line 2-2 in FIG. 1.
Figure 10:
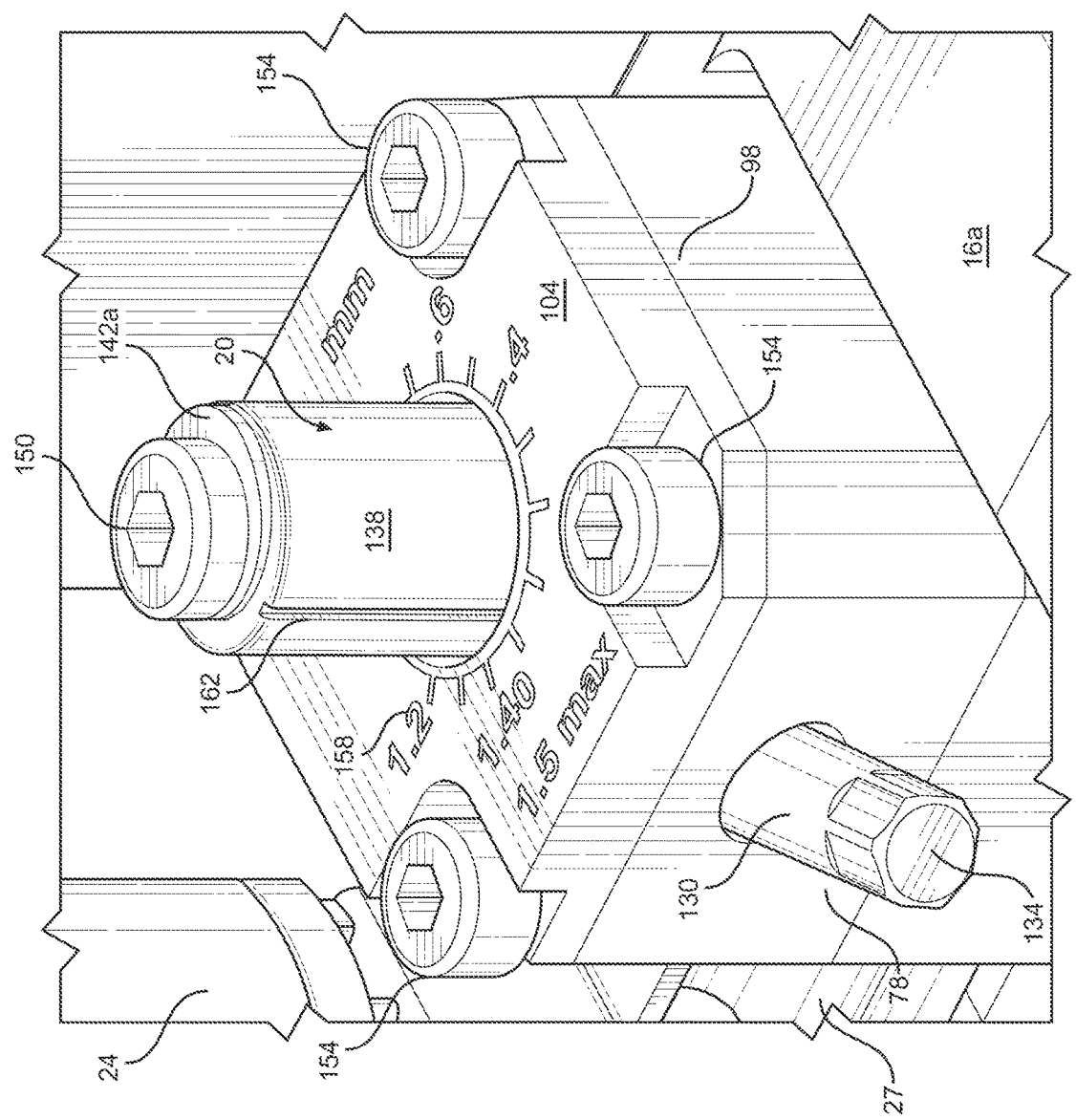
FIG. 10 is a perspective view of the dispenser module of the dispenser of FIG. 1.

Continuing with FIGS. 4 and 10, the upper end 106a of the adjustment rod 106 can include a hex recess 150 formed into the upper end 106a for adjusting the stroke length of the valve member 68 with a hex tool (not shown) when the locking collar 114 is in the unlocked configuration. When the locking collar 114 is in the unlocked configuration, engagement between a hex tool and the hex recess 150 can be used to rotate the adjustment rod 106, and thus change the axial position of the adjustment rod 106 relative to the locking collar 114. By engaging a hex tool with the hex recess 150 to rotate the adjustment rod 106, the external threads 110 of the adjustment rod 106 interact with the internal threads 114a of the locking collar 114 to incrementally move the adjustment rod 106 upward or downward along the vertical direction 6. Because the lower end 106b of the adjustment rod 106 limits the upward movement of the valve member 68 to the retracted position, this upward and downward movement of the adjustment rod 106 functions to adjust the stroke length of the valve member 68. Though depicted as having a hex shape, the hex recess 150 can comprise other shapes as desired.

In one embodiment, the stroke adjustment assembly 20 can include a knurled knob 138 attached to the adjustment rod 106, where the outer surface of the knurled knob 138 can include a plurality of small projections or ridges to provide increased friction for easier gripping and rotation. To maintain friction between the knurled knob 138 and the adjustment rod 106 and thus prevent inadvertent rotational movement of the knurled knob 138 relative to the adjustment rod 106, one or more O-rings 146 can be disposed between the knurled knob 138 and the adjustment rod 106. In the depicted embodiment, the stroke adjustment assembly 20 includes two O-rings 146, though more or less can be included as desired. Further, the stroke adjustment assembly 20 includes an upper retaining ring 142a disposed around the adjustment rod 106 adjacent the upper end of the knurled knob 138, and a lower retaining ring 142b disposed around the adjustment rod 106 adjacent the lower end of the knurled knob 138. The upper and lower retaining rings 142a, 142b prevent the knurled knob 138 from moving axially relative to the adjustment rod 106 as the knurled knob 138 is rotated.

During hot melt adhesive dispensing applications, maintaining the valve member 68 at the correct stroke length can be instrumental in ensuring hot melt adhesive is dispensed onto the substrate in the amount and shape desired. As a result, the stroke adjustment assembly 20 can include various visual markings to help an operator of the dispenser 10 accurately set the stroke length by adjusting the adjustment rod 106. With reference to FIG. 10, the top plate 104 can include a plurality of markings 158 radially arranged around the knurled knob 138, where each of the plurality of markings 158 corresponds to a particular stroke length of the valve member 68. The knurled knob 138 can include a corresponding visual indicator 162, which can take the form of a vertically-extending notch or groove. Based upon the position of the visual indicator 162 relative to the plurality of markings 158, the operator of the dispenser 10 can rotate the adjustment rod 106 using the hex recess 150 to adjust and fine-tune the stroke length of the valve member 68 to a high degree of accuracy. Though a plurality of markings 158 formed into the top plate 104 is shown for visually monitoring the stroke length of the valve member 68, it is contemplated that alternative arrangements can be used to monitor the stroke length, such as a sensor and digital dial.

As noted previously, the adjustment rod 106 controls the stroke length of the adjustment rod 106 by limiting the upward movement of the adjustment rod 106 when the adjustment rod 106 moves to the retracted position. When the valve member 68 moves to the retracted position, the piston portion 70 of the valve member 68 impacts and imparts an upward force on the lower end 106b of the adjustment rod 106. During the operational lifetime of the dispenser 10, these impacts can occur a high number of times. To prevent upward movement of the adjustment rod 106 and the locking collar 114 due to this force, the stroke adjustment assembly 20 can include a Belleville spring 126 disposed within the adjustment chamber 118 that imparts a force on the locking collar 114. The Belleville spring 126 can be disposed around the adjustment rod 106 and contact both the upper surface of the adjustment chamber 118 and the upper surface of the locking collar 114. The Belleville spring 126 can impart a sufficient force on the upper surface of the locking collar 114 such that the force from repeated impacts of the piston section 70 of the valve member 68 on the adjustment rod 106 does not move the locking collar 114 and the adjustment rod 106, while still allowing the locking collar 114 to be transitioned between the locked and unlocked configurations. To prevent the Belleville spring 126 from contacting the adjustment rod 106, the stroke adjustment assembly 20 can include a washer 122 disposed around the adjustment rod 106 radially between the adjustment rod 106 and the Belleville spring 126. Though the washer 122 is depicted as an L-washer, other types of washers are contemplated.

The inclusion of the stroke adjustment assembly 20 in the dispenser 10, and thus the ability to adjust the stroke length of the valve member 68, increases the flexibility of dispensing applications in which the dispenser 10 can be utilized. Without the stroke adjustment assembly 20, the stroke length of the dispenser module 10 would remain constant, and each dispenser module 10 would only be useful for a select range of dispensing applications. Further, the inclusion of the locking collar 114 to control the ability of the adjustment rod 106 to move provides increased stability within the stroke adjustment assembly 20 and helps prevent the stroke length from changing during repeated actuations of the valve member 68. This effect is achieved through the ability of the inner threads 114a of the locking collar 114 to engage and impart a force on both the upper and lower surfaces 115a, 115b of the external threads 110 of the adjustment rod 106. The Belleville spring 126 also serves to increase the stability of the stroke adjustment assembly 20 by imparting a consistent force on the locking collar 114, thus preventing the locking collar 114 from moving due to impacts on the adjustment rod 106 from the valve member 68, while still allowing the locking collar 114 to transition between the locked and unlocked configurations. Additionally, the threaded engagement between the adjustment rod 106 and the locking collar 114, as well as the relationship between the plurality of markings 158 on the top plate 104 and the visual indicator 162 on the knurled knob 138, allows the stroke length to be fine-tuned to a high degree of accuracy.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A liquid dispenser module, comprising:
   a housing including an inlet, an outlet, and a chamber in communication with the inlet and the outlet for receiving a liquid;
   a valve member configured to be actuated from a first position to a second position so as to jet an amount of the liquid from the chamber through the outlet, wherein the first and second positions are separated by a stroke length; and
   a stroke adjustment assembly comprising:
      an adjustment rod that includes external threads and is configured to contact the valve member; and
      a locking collar that includes internal threads and is configured to alternate between an unlocked and a locked configuration, wherein 1) when the locking collar is expanded into the unlocked configuration, the adjustment rod is movable relative to the locking collar to adjust the stroke length, and 2) when the locking collar is compressed into the locked configuration, the internal threads of the locking collar apply a locking force to the external threads of the adjustment rod so as to prevent the adjustment rod from moving relative to the locking collar.

2. The liquid dispenser module of claim 1, wherein each of the external threads of the adjustment rod has an upper surface and a lower surface, wherein the internal threads of the locking collar are configured to apply a force to the upper and lower surfaces of the external threads when the locking collar is in the locked configuration.

3. The liquid dispenser module of claim 1, wherein the adjustment rod is rotatable relative to the locking collar when the locking collar is in the unlocked configuration so as to adjust the stroke length.

4. The liquid dispenser module of claim 1, wherein the housing defines an adjustment chamber, wherein the locking collar and a portion of the adjustment rod are disposed in the adjustment chamber.

5. The liquid dispenser module of claim 4, wherein the stroke adjustment assembly further comprises a locking screw coupled to the locking collar, wherein actuation of the locking screw alternates the locking collar between the unlocked configuration and the locked configuration.

6. The liquid dispenser module of claim 5, wherein the locking screw extends from a threaded portion that engages the locking collar and is disposed within the adjustment chamber to a shaft portion disposed external to the adjustment chamber.

7. The liquid dispenser module of claim 4, wherein the stroke adjustment assembly further comprises a Belleville spring disposed within the adjustment chamber for imparting a force on an upper end of the locking collar.

8. The liquid dispenser module of claim 1, wherein an upper end of the adjustment rod includes a hex recess for receiving a hex tool, wherein the hex tool is configured to engage the hex recess to move the adjustment rod relative to the locking collar to adjust the stroke length when the locking collar is in the unlocked configuration.

9. The liquid dispenser module of claim 8, wherein the stroke adjustment assembly further comprises a knurled rod disposed around the upper end of the adjustment rod, wherein an upper surface of the housing has a plurality of markings and the knurled rod has a visual indicator, such that a relation between the plurality of markings and the visual indicator is indicative of the stroke length.

10. The liquid dispenser module of claim 1, wherein:
the valve member is configured to be actuated from the first position to the second position along a vertical direction; and
the locking collar defines a fixed position along the vertical direction.

11. The liquid dispensing module of claim 5, wherein the locking screw is configured to rotate in a first rotational direction so as to compress the locking collar into the locked configuration, and rotate in a second rotational direction that is opposite the first rotational direction so as to expand the locking collar into the unlocked configuration.

* * * * *